United States Patent

[11] 3,629,066

| [72] | Inventors | Herbert Olof Andersson;<br>Per Anders Ekwall, both of Vasteras, Sweden |
|---|---|---|
| [21] | Appl. No. | 751,407 |
| [22] | Filed | Aug. 9, 1968 |
| [45] | Patented | Dec. 21, 1971 |
| [73] | Assignee | Allmanna Svenska Elektriska Aktiebolaget Vasteras, Sweden |
| [32] | Priority | Sept. 4, 1967 |
| [33] | | Sweden |
| [31] | | 12212/67 |

[54] FUEL ASSEMBLY FOR NUCLEAR REACTORS AND HELICAL SPACERS HAVE BUNDLES OF FUEL PINS
8 Claims, 5 Drawing Figs.

[52] U.S. Cl. .................................................. 176/76, 176/78, 176/81
[51] Int. Cl. ...................................................... G21c 3/32
[50] Field of Search .......................................... 176/76, 78, 81, 87

[56] References Cited
UNITED STATES PATENTS

| 2,902,422 | 9/1959 | Hutter | 176/81 X |
| 3,096,264 | 7/1963 | Bauer | 176/81 X |
| 3,179,571 | 4/1965 | Schabert et al. | 176/68 |
| 3,290,224 | 12/1966 | Robertson | 176/81 |
| 3,309,283 | 3/1967 | Alfille et al. | 176/81 X |
| 3,310,474 | 3/1967 | Saunders | 176/78 X |
| 3,318,778 | 5/1967 | Morita | 176/78 X |
| 3,330,736 | 7/1967 | Cousseran et al. | 176/81 |
| 3,361,640 | 1/1968 | Hassig et al. | 176/78 |

*Primary Examiner*—Carl D. Quarforth
*Assistant Examiner*—Gary Solyst
*Attorney*—Jennings Bailey, Jr.

ABSTRACT: A fuel assembly for nuclear reactors is formed of a polygonal sheathing tube and a bundle of fuel pins inside the tube. The pins are provided with helically wound spacer elements of equal pitch. The fuel pins are of two different types, pins of type B having one more spacer element than those of type A. Each pin of type A is surrounded by six pins of type B, and each fuel pin of type B, except those at the sides of the bundle, is surrounded by alternate pins of types A and B.

INVENTOR
HERBERT OLAF ANDERSON
BY PER ANDERS EKWALL

INVENTOR.
HERBERT OLAF ANDERSSON
BY PER ANDERSEKWALL
Jennings Bailey Jr

FUEL ASSEMBLY FOR NUCLEAR REACTORS AND HELICAL SPACERS HAVE BUNDLES OF FUEL PINS

BACKGROUND OF THE INVENTION

1. Field of the Invention

The present invention relates to a fuel assembly for nuclear reactors said assembly comprising a polygonal sheathing tube and a polygonal bundle of fuel pins arranged inside the sheathing tube, said bundle comprising at least one grid plate rigidly attached at one end of the sheathing tube, a plurality of substantially parallel fuel pins held by the grid plate and helically wound cylindrical spacer elements arranged around each of a number of said fuel pins, the fuel pins being spaced in an equilateral triangular pitch by said spacer elements and all of said spacer elements being wound in an identical direction and having a substantially equal spiral pitch.

2. The Prior Art

In nuclear reactors having narrow fuel rod lattices, for instance fast reactors, having a nominal distance between the rods of only a millimeter or two, there is no space to arrange conventional spacer elements between the fuel rods. It has been proposed to use wire as spacer element, in which case the wire is arranged helically along and around the fuel rods. A bundle is then obtained which has negligible, if any, elasticity. Such bundles therefore tend to be either too "loose" or too rigid. In a "loose" bundle the fuel rods will be subjected to strong vibrations from the rapidly flowing coolant (particularly in fast reactors) and are rapidly damaged, for example due to wear so that one or more holes appear in the cladding tubes. In a rigid bundle, on the other hand, the rods are subjected to too great bending stresses arising from the unavoidable manufacturing tolerances of the components in the fuel assembly and from the different expansion coefficients of these components so that the fuel rods are damaged in this case as well.

SUMMARY OF THE INVENTION

The object of the present invention is to effect a fuel assembly of the type described in the first paragraph in which the above-mentioned disadvantages are completely eliminated. This is made possible by the fuel pins being of two different types, called A and B, each fuel pin B carrying one spacer element more than each fuel pin A, and each fuel pin A, except those at the sides of the bundle, being surrounded and supported at six different and substantially equidistant levels per turn by six fuel pins B, and each fuel pin B, except those at the sides of the bundle, being surrounded and supported at six different and substantially equidistant levels per turn by six fuel pins arranged so that they are alternately of type A and B. This construction offers an elastically compressible bundle in which the flexure of the fuel pins can be utilized to provide the desired contact pressure between the fuel pins, in order to reduce the necessity for extremely small manufacturing tolerances for the components in a fuel assembly, particularly the fuel pins and sheathing tube, and to reduce the effect of different thermal expansion owing to different thermal expansion coefficients and different temperature of the various components in the fuel assembly. Each group of three adjacent fuel pins (in this case the wall of the sheathing tube may also be considered as one of the fuel pins) substantially encloses a subchannel for the flow of coolant. Helical spacer elements arranged in the manner described above considerably improve the interspersion of the coolant in and between the subchannel and improve the heat transfer.

The spacer elements suitably consist of the same material as the cladding tubes of the fuel pins and may, for example, consist of wire having any chosen cross section (for example circular, a square or parallel trapezium shaped). The wire may be attached to respective fuel pins only at the ends of the wire and under a certain prestress in order to keep it in position in spite of the influence of temperature transients and the flow pressure of the coolant. The spacer elements may also with advantage consist of fins made in one piece with the respective cladding tubes. Since the bundle of fuel pins thus has a certain elasticity, as opposed to the grid plate, it is suitable that each fuel pin carries a narrow resilient pin arranged as an extension of the fuel pin, the free end of the extension pin being attached to the grid plate, preferably by means of welding.

In the simplest embodiment of the invention each fuel pin of type B carries a single helical spacer element, the height of the spacer element in radial direction being substantially equal to the nominal distance between two adjacent fuel pins. The fuel pins of type A are thus in this case unwound. In an alternative and more advantageous embodiment, each fuel pin of type B carries two diametrically advantageous spacer elements and each fuel pin of type A carries one single spacer element, the height of the spacer elements in radial direction being substantially equal to half the nominal distance between two adjacent fuel pins. This embodiment offers several advantages, of which the following should be mentioned:

a. Very little probability of damage to the cladding tubes due to wear, since all contact between the fuel pins is through abutment of spacer element against spacer element (for example, fin against fin).

b. Extra support members to provide support for the pins of type A at the edges of the bundle against the surrounding sheathing tube are unnecessary.

c. Constriction of the coolant channels is obtained near the wall of the sheathing tube, which decreases the dangerous temperature gradient for the peripheral fuel pins.

d. If they are provided with fins the fuel pins will be more rigid and the necessary contact pressure is thus achieved with less deformation of the pins. By machining the height of the fins to exact dimensions the accuracy of dimension of the whole fuel pin bundle is considerably increased and too great variations in contact pressure are avoided. Fins may therefore have greater spiral pitch than wire and this causes a lower pressure drop over the reactor core and better economy.

BRIEF DESCRIPTION OF THE DRAWINGS

The invention will now be described in more detail with reference to the accompanying drawings.

DESCRIPTION OF THE PREFERRED EMBODIMENT

Figure 2:
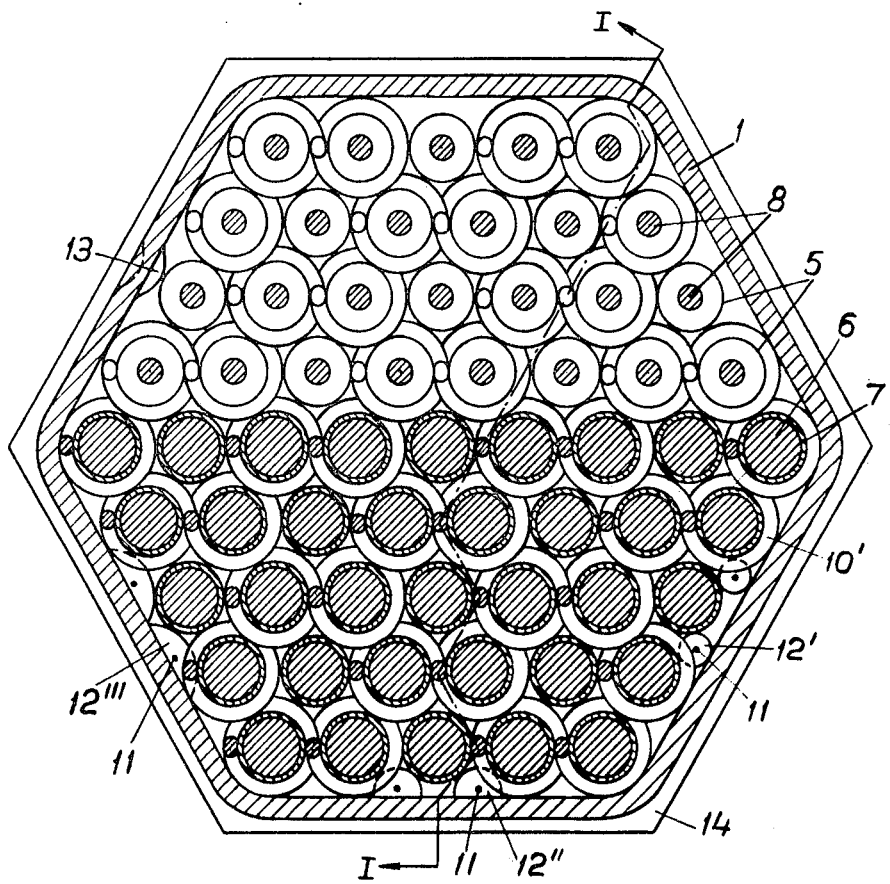
FIG. 2 shows the fuel assembly according to FIG. 1 in cross section along the line II—II in the same figure.

The fuel assembly shown in the drawings has a sheathing tube 1 having substantially hexagonal cross section. Other polygonal cross sections are also possible, preferably those in which the angle between two adjacent sides in a whole-number multiple of 60°, to exploit the advantages of the present invention. At one end, the inlet end 2 for coolant, the sheathing tube 1 is provided with a grid plate 4. The fuel pins 5 are substantially parallel and contain ceramic nuclear fuel 6, for example in the form of $UO_2$ pellets, in cladding tubes 7. Each fuel pin 5 carries a narrow resilient pin 8 arranged as an extension of the fuel pin, the free end of the extension pin being attached to the grid plate 4 (at 9) in a suitable manner, for example by means of welding. The fuel pins 5 are arranged in an equilateral triangular pitch and held at predetermined distances from each other with the help of nonresilient spacer elements 10. These consist of wires 10' or fins 10'' applied helically around each of at least two-thirds of the fuel pins and being wound in an identical direction and having a substantially equal spiral pitch. They also have the starting and finishing points situated similarly. The wires 10' or fins 10'' preferably consist of the same material as the cladding tubes 7.

As seen in the drawings, the fuel pins are of two different types, which may be called A and B. Each fuel pin of type B carries one spacer element more than each fuel pin of type A. In the embodiment according to FIG. 2 the fuel pins of type B are wound with a single wire and the fuel pins of type A are unwound, whereas in the embodiment according to FIG. 5 the fuel pins of type B are provided with two fins and the fuel pins of type A with one fin. In both cases the fuel pin lattice is constructed in the same manner, which is shown in the sketch in FIG. 3. In the lower left-hand part of this figure the arrangement of the fuel pins of type B is shown, in the lower right-hand part the arrangement of the fuel pins of type A and in the other half of the figure a complete pin lattice comprising pins of both types A and B. The table below shows the number of fuel pins of type A in relation to the total number of fuel pins (A+B) in a fuel assembly having hexagonal cross section, assuming that the central pin is of type A.

| A+B | 7 | 19 | 37 | 61 | 91 | 127 | 169 |
|---|---|---|---|---|---|---|---|
| A | 1 | 7 | 13 | 19 | 31 | 43 | 55 |

Due to this construction principle for the fuel pin lattice as seen above, each fuel pin of type A, except those at the sides of the bundle, will be surrounded, and supported at six different and substantially equidistant levels per turn supported by six fuel pins of type B, whereas each fuel pin of type B, except those at the sides of the bundle, will be surrounded and, at six different and substantially equidistant levels per turn, supported by six fuel pins arranged so that the fuel pins are alternately of type A and type B.

Figure 4:
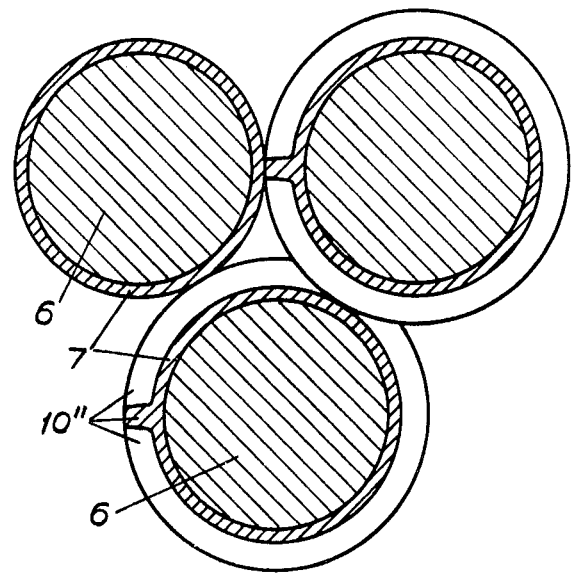
FIGS. 4 and 5 show in cross section alternative embodiments of some of the fuel pins in the fuel assembly according to FIGS. 1 and 2.

If the spacer elements 10 consist of wire 10', this may have any desired cross section, for example circular, square or parallel trapezium shaped. In the embodiment according to FIGS. 1 and 2 the thickness of the wire is substantially equal to the nominal distance between the fuel pins 5 and the wires 10' are attached, for example by means of welding, to respective fuel pins 5 only at the ends of the wires and under a certain prestress to hold them in position in spite of the influence of temperature transients and the flow pressure of the coolant. FIG. 4 shows that the wire 10' may be replaced by a fin 10''. The fin may be made as a unit with the tube or applied subsequently.

Figure 3:
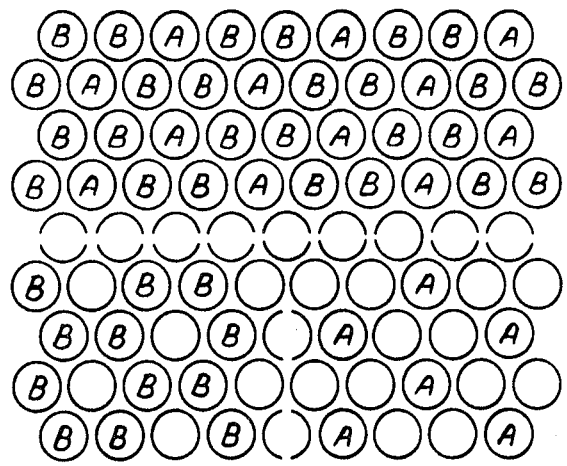
FIG. 3 shows the principle of the pin arrangement in a fuel assembly according to FIGS. 1 and 2.

As seen in FIG. 2 the fuel pins which are not wound and are situated at the edges of the bundle will have no support against the wall of the sheathing tube 1. Such support can be arranged with the help of a number of support members. These may consist, for example, of pellets 12', semispheres 12'', sphere-segments 12''' or the like threaded onto wires 11 (substantially parallel to he fuel pins) or they may consist of depressions 13 in the wall of the sheathing tube. The depressions 13 for a fuel rod 5 may be arranged in a row or, with with the pellets 12 or the like on the wires 11, they may be arranged in two rows in such a way that the unwound pins 5 at the edges of the bundle receive the same support as those within the bundle, that is, they are supported at six consecutive, different and substantially equidistant levels per turn.

Figure 5:
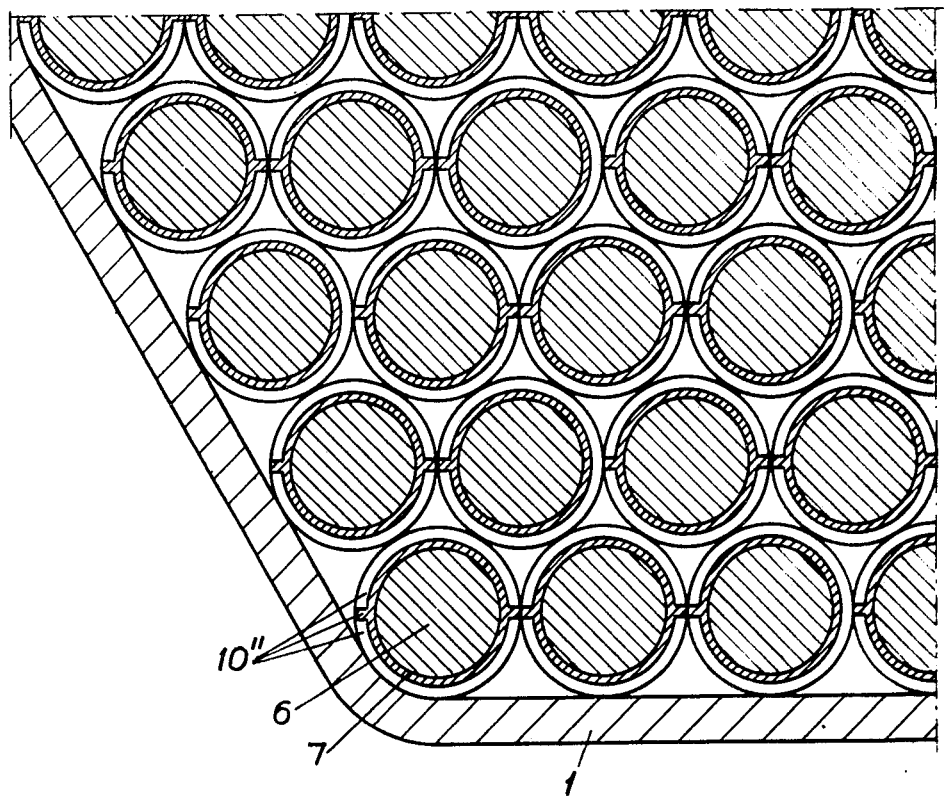

In the embodiment according to FIG. 5 each pin 5 of type A carries a single fin 10'', whereas each pin 5 of type B carries two diametrically opposite fins 10''. The height of the fins is in this case substantially equal to half the nominal pin distance. Of course, wire of corresponding thickness may be used instead of fins. Whereas a fuel pin having a single wire or fin can be compared to a screw having a single thread, a fuel pin having two fins or wires can be compared to a screw having a double thread. One advantage of the embodiment according to FIG. 5 is that vibration-induced wear, if any, will occur wire against wire or fin against fin instead of fin or wire against cladding tube. Other advantages are that extra support members (designated 11, 12, or 13 in FIG. 2) are not necessary and that constriction of the coolant channels near the wall of the sheathing tube is obtained (since the height of the fins is equal to half the nominal pin distance), which decreases the dangerous temperature gradients of the peripheral fuel pins. Fuel pins provided with fins have greater rigidity than pins wound with wire and the necessary contact pressure is thus achieved with less deformation of the pins. By machining the height of the fins to exact dimensions the accuracy of dimension of the whole fuel pin bundle is considerably increased and thus too great variations in contact pressure are avoided. Fins may therefore have greater spiral pitch than wire and this causes a lower pressure drop over the reactor core and better economy.

The fuel pins, which may be provided with fertile material at the ends and fertile material in the middle, may have a diameter of for example 6 to 7 mm., at length of approximately 1.5 m. and be arranged with a nominal distance between the pins of just over 1 mm. The pitch of the wires or fins may then be 100-300 mm. All these figures may be exceeded or reduced by a considerable fraction and still the good result be obtained.

Figure 1:
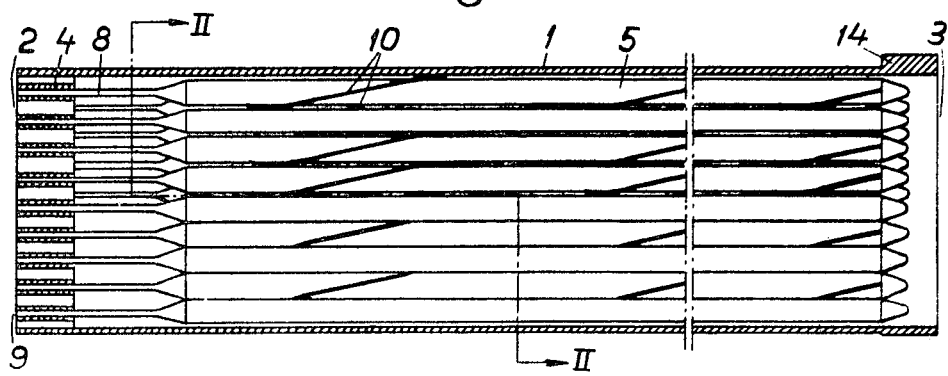
FIG. 1 shows a fuel assembly in longitudinal section along the line I—I in FIG. 2.

In the embodiment shown in FIGS. 1 and 2 the sheathing tube is provided with a shoulder 14 at the outlet end 3 of the fuel assembly. This shoulder gives guidance against the adjacent fuel assemblies and sealing of the gaps between them. In certain cases it may be suitable to arrange a shoulder 14 at each end of the fuel assembly and also one or more between, whereas in other cases shoulders may be completely omitted.

Since under all operating conditions the fuel pins must have good contact with each other and the wall of the sheathing tube across the spacer elements, there must be a certain contact pressure between these components. Otherwise the bundle will to too "loose," in which case the fuel pins will be damaged by vibrations. With this demand for contact pressure it may be difficult to insert the fuel pin bundle in the sheathing tube. However, the assembling may be carried out as follows: First the pin extensions of the fuel pins are inserted in the grid plate and attached to the plate, for example by means of welding. A bundle is then obtained which diverges from the grid plate towards the free ends of the fuel pins. After this bundle is compressed from the sides with the help or pressure plates or the like to assembling dimensions. The pin extensions can now be finally welded to the grid plate if previously there was a certain risk of them being incorrectly angled. The space in the compressed bundle is now filled with a medium which by suitable methods can be solidified at a temperature at which the fuel pins are not damaged. The medium should also be easy to remove. For example a medium may be used which, by increased temperature or in some other way, can be liquified or which can be rinsed, for example with water. These requirements are fulfilled, amongst other things, by water solutions of cane sugar (preferably 20 percent by weight of sugar) and water solutions of glycerine. The fuel pins will not be subjected to any damage due to the expansion of the medium since this takes place before solidification. Low melting-point metals may also be used, such as sodium or potassium, or low melting-point metal alloys, such as type metal. It is also feasible to use certain plastics. When the medium has solidified the pressure plates compressing the bundle can be removed and the bundle inserted in the sheathing tube. When the medium has been removed, the grid plate is attached to the sheathing tube and the fuel assembly is then assembled.

The above description and the accompanying drawings are only intended to illustrate the general principle of the invention and many embodiments are feasible within the scope of the following claims. For example the invention may be used for fuel assemblies having two grid plates, although it has been chosen to illustrate a fuel assembly having a single grid plate.

We claim:

1. A fuel assembly for nuclear reactors, said assembly comprising a polygonal sheathing tube and a polygonal bundle of fuel pins arranged inside the sheathing tube, said bundle comprising at least one grid plate rigidly attached at one end of the sheathing tube, a plurality of substantially parallel fuel pins held by the grid plate and helically wound cylindrical spacer elements arranged around each of a number of said fuel pins, the fuel pins being spaced in an equilateral triangular pitch by said spacer elements and all of said spacer elements being wound in an identical direction and having a substantially spiral pitch wherein the improvement comprises that the combination of fuel pins and spacer elements are of two different types, called A and B; each fuel pin combination B carrying one spacer element more than each fuel pin combination A; each fuel pin combination A; fuel pin combination A, except those at the sides of the bundle, being surrounded and supported at six different and substantially equidistant levels per turn by six fuel pins combination B; each fuel pin combination B, except those at the sides of the bundle, being surrounded and supported at six different and substantially equidistant levels per turn by six fuel pins which are alternately of type A and type B.

2. A fuel assembly according to claim 1, each fuel comprising ceramic nuclear fuel surrounded by a cladding tube, said spacer elements consisting of the same material as the cladding tubes.

3. A fuel assembly according to claim 1, wherein each spacer element consists of a wire.

4. A fuel assembly according to claim 3, wherein the wire is attached to fuel pin only at the ends of the wire and under prestress.

5. A fuel assembly according to claim 2, wherein each spacer element consists of a fin manufactured in one piece with the cladding tube.

6. A fuel assembly according to claim 1, wherein each fuel pin carries a narrow resilient pin arranged as an extension of the fuel pin, the free end of the extension pin being attached to the grid plate.

7. A fuel assembly according to claim 1, in which the fuel pins are spaced apart by a nominal distance, wherein each fuel pin combination B carries a single spacer element, the spacer element in radial direction having a height substantially equal to the nominal distance between two adjacent fuel pins.

8. A fuel assembly according to claim 1, which the fuel pins are spaced apart by a nominal distance, wherein each fuel pin combination B carries two diametrically opposite spacer elements and each fuel pin A carries one single spacer element, the spacer elements in radial direction having a height substantially equal to half the nominal distance between two adjacent fuel pins.

* * * * *